(12) United States Patent
Meyer et al.

(10) Patent No.: US 10,513,767 B2
(45) Date of Patent: Dec. 24, 2019

(54) METHOD OF CONTINUOUSLY HEAT-TREATING 7000-SERIES ALUMINIUM ALLOY SHEET MATERIAL

(71) Applicant: ALERIS ALUMINUM DUFFEL BVBA, Duffel (BE)

(72) Inventors: Philippe Meyer, Koblenz (DE); Sunil Khosla, Beverwijk (NL)

(73) Assignee: ALERIS ALUMINUM DUFFEL BVBA, Duffel (BE)

( * ) Notice: Subject to any disclaimer, the term of this patent is extended or adjusted under 35 U.S.C. 154(b) by 248 days.

(21) Appl. No.: 15/529,593

(22) PCT Filed: Nov. 19, 2015

(86) PCT No.: PCT/EP2015/077050
§ 371 (c)(1),
(2) Date: May 25, 2017

(87) PCT Pub. No.: WO2016/091550
PCT Pub. Date: Jun. 16, 2016

(65) Prior Publication Data
US 2017/0306466 A1 Oct. 26, 2017

(30) Foreign Application Priority Data

Dec. 11, 2014 (EP) .................................. 14197428

(51) Int. Cl.
*C22F 1/047* (2006.01)
*C22C 21/06* (2006.01)
(Continued)

(52) U.S. Cl.
CPC ................ *C22F 1/053* (2013.01); *C21D 1/26* (2013.01); *C21D 1/42* (2013.01); *C21D 9/56* (2013.01);
(Continued)

(58) Field of Classification Search
CPC .. C22F 1/043; C22F 1/047; C22F 1/05; C22C 21/02; C22C 21/06; C22C 21/08
See application file for complete search history.

(56) References Cited

U.S. PATENT DOCUMENTS 2,201,308 A 5/1940 Edge
2,448,009 A 8/1948 Baker
(Continued)

FOREIGN PATENT DOCUMENTS

CN 201785465 U 4/2011
CN 102066596 A 5/2011
(Continued)

OTHER PUBLICATIONS

"Aluminum Handbook, vol. 2: Forming, Casting, Surface Treatment, Recycling and Ecology", Aluminium-Verlag Marketing and Kommunikation GmbH, pp. 194-199, 2003.
(Continued)

*Primary Examiner* — Lois L Zheng
(74) *Attorney, Agent, or Firm* — Vorys, Sater, Seymour and Pease LLP

(57) ABSTRACT

A method for continuously solution heat-treating aluminium alloy sheet by continuously moving heat-treatable 7000-series aluminium alloy sheet through a continuous heat-treatment furnace arranged to heat the moving aluminium sheet to a set soaking temperature ($T_{SET}$) in the temperature range of 370° C. to 560° C., the continuous heat-treatment furnace has an entry section and an exit section, the moving aluminium sheet moves substantially horizontally through the continuous heat-treatment furnace, and the moving aluminium sheet is rapidly cooled on leaving the exit section, and before or near the entry section of the continuous heat-treatment furnace the moving aluminium sheet is preheated to a temperature of 5° C. to 100° C. below the $T_{SET}$ using an average heat-up rate as function of the sheet
(Continued)

thickness of at least $Y=-31 \cdot \ln(X)+50$, wherein Y is the heat-up rate in °C./sec and X is the sheet thickness in mm.

18 Claims, 3 Drawing Sheets

(51) Int. Cl.
    *C22F 1/053*     (2006.01)
    *C21D 9/63*     (2006.01)
    *C22C 21/10*     (2006.01)
    *C21D 9/56*     (2006.01)
    *C21D 1/26*     (2006.01)
    *C21D 1/42*     (2006.01)

(52) U.S. Cl.
    CPC ............... *C21D 9/63* (2013.01); *C22C 21/10* (2013.01); *Y02P 10/253* (2015.11)

(56) References Cited

U.S. PATENT DOCUMENTS

| | | | |
|---|---|---|---|
| 2,887,422 | A | 5/1959 | Stone et al. |
| 3,194,545 | A | 7/1965 | Smith |
| 3,447,745 | A | 6/1969 | Perrine et al. |
| 4,124,415 | A | 11/1978 | Sporenberg et al. |
| 5,045,770 | A | 9/1991 | Brooks |
| 5,214,258 | A | 5/1993 | Akers |
| 5,739,506 | A | 4/1998 | Hanton et al. |
| 5,770,838 | A | 6/1998 | Rohrbaugh et al. |
| 10,294,553 | B2 | 5/2019 | Meyer et al. |
| 2005/0183801 | A1 | 8/2005 | Unal et al. |
| 2007/0209739 | A1* | 9/2007 | Zhao .................. B22D 11/0605 148/551 |
| 2011/0111081 | A1 | 5/2011 | Chen et al. |
| 2015/0218677 | A1 | 8/2015 | Aruga et al. |
| 2015/0275326 | A1 | 10/2015 | Gripenberg et al. |

FOREIGN PATENT DOCUMENTS

| | | |
|---|---|---|
| CN | 102517436 A | 6/2012 |
| EP | 0818553 A1 | 1/1998 |
| EP | 2581218 A1 | 4/2013 |
| JP | 109241811 A | 9/1997 |
| JP | H09241811 A | 9/1997 |
| JP | H1029866 A | 2/1998 |
| JP | H10298668 A | 11/1998 |
| JP | 2011179035 A | 9/2011 |
| WO | 2010049445 A1 | 5/2010 |
| WO | 2014046047 A1 | 3/2014 |
| WO | 2014053657 A1 | 4/2014 |

OTHER PUBLICATIONS

Office Action dated Jun. 12, 2018 from Canadian Patent Application No. 2,970,410 to Aleris Aluminum Duffel BVBA.
J.R. Davis, ASM Specialty Handbook "Aluminum and Aluminum Alloys", pp. 321-323, 1993.
Continuous annealing—some plant options; Aluminum Today Feb. 1990; pp. 10-20.
Heat Treating of Aluminum Alloys; ASM Handbook vol. 4 Heat treating (1991); pp. 841-879.
Key to Aluminum Alloys; Hufnagel; Auflage 4 (1991).
R.C. Gibson, High Efficiency Induction Heating as a Production Tool for Heat Treatment of Continuous Strip Metal, Heat Treatment Technology, Sheet Metal Industries, Dec. 1982.
Metallurgy of Heat Treatment and General Principles of Precipitation Hardening, Chapter 5, Aluminum Properties and Physical Metallurgy, p. 134-199,1984, ASM International.
Encyclopedia extract, Induction heating, McGraw-Hill Concise Encyclopedia of Engineering, 2002.
Mei et al., Modeling of Slab Induction Heating in Hot Rolling by FEM, Engineering, Scientific Research, 2011, 3; pp. 364-370.
Berggren et al., Induction Heating: A Guide to the Process and Its Benefits, Gear Solutions, Jul. 2012.
Theory of Heating by Induction, Chapter 2, ASM International, 2001.
Mühlbauer, History of Induction Heating and Melting, 2008, Vulkan Verlag.
Beer et al., Combined log heating furnace—inlineconcept for aluminum extruders, Heat processing Feb. 2012.
Heat Treatment of Strip Aluminium Using TFX; Aluminium Industry vol. 7, No. 1 Jan. 1988.
Waggott et al., Transverse flux induction heating of aluminiumalloy strip, ISSN: 0307-1693, Dec. 1982.
Proposal of Induction Heating System for All Aluminum Alloys, Sumitomo Heavy Industries, LTD., Japan,1985.
Rushing, Memorandum re Sumitomo VFX process discussion with Kobe steel, Mar. 30, 1993.
Brawers et al., Experience With a 2.8 MW TFX Transverse Flux Continuous Thermal Treatmen Line for Aluminium Strip; discussion operations Jul. 1986.
International Search Report and Written Opinion dated Feb. 16, 2016 for PCT/EP2015/077050 to Aleris Aluminum Duffel BVBA filed Nov. 19, 2015.
Understanding the Alloys of Aluminum, AlcoTec, URL: <http://www.alcotec.com/us/en/education/knowledge/techknowledge/understanding-the-alloys-of-aluminum.cfm# >, retrieved from the Internet Jun. 29, 2019.
Registration Record Series Teal Sheets, International Alloy Designations and Chemical Composition Limits for Wrought Aluminum and Wrought Aluminum Alloys, The Aluminum Association, Revised Jan. 2015.

* cited by examiner

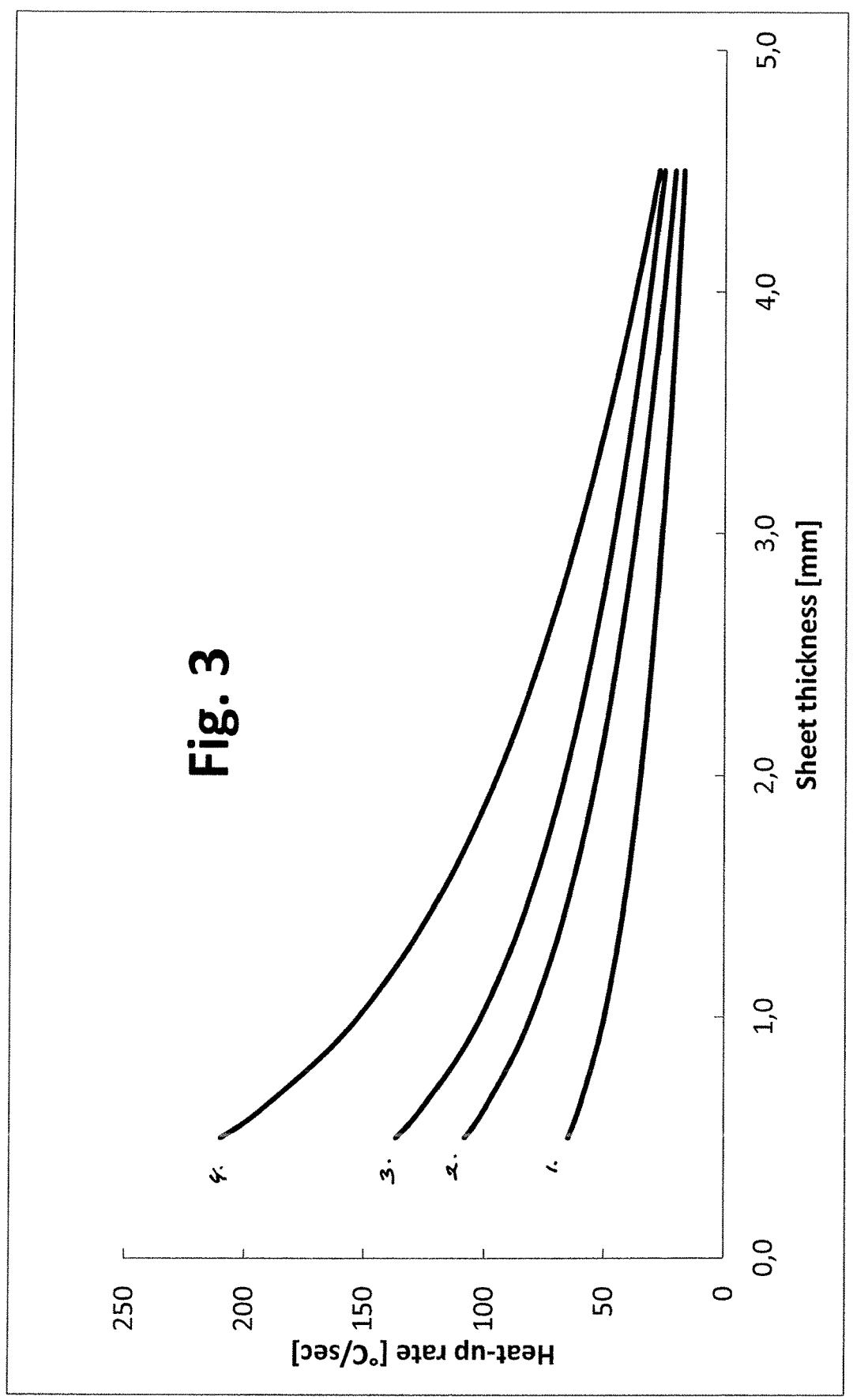

METHOD OF CONTINUOUSLY HEAT-TREATING 7000-SERIES ALUMINIUM ALLOY SHEET MATERIAL

FIELD OF THE INVENTION

Method for continuously solution heat-treating aluminium AA7000-series alloy sheet by continuously moving uncoiled aluminium alloy sheet in the direction of its length through a continuous heat-treatment furnace arranged to heat the moving aluminium sheet to a solution heat treatment temperature or solutionizing temperature in a range of 370° C. to 560° C.

BACKGROUND TO THE INVENTION

As will be appreciated herein below, except as otherwise indicated, aluminium alloy designations and temper designations refer to the Aluminium Association designations in Aluminium Standards and Data and the Teal Sheets Registration Record Series as published by the Aluminium Association in 2014 and frequently updated, and well known to the persons skilled in the art. For any description of alloy compositions or preferred alloy compositions, all references to percentages are by weight percent unless otherwise indicated.

7000-series aluminium alloys are aluminium alloys containing zinc as the predominate alloying ingredient other than aluminium. For purposes of the present application, 7000-series aluminium alloys are aluminium alloys having at least 2.0% Zn, and up to 10% Zn, with the zinc being the predominate alloying element other than aluminium.

In the production of motor vehicles in particular aluminium alloys the AA5000- and AA6000-series alloys like 5051, 5182, 5454, 5754, 6009, 6016, 6022, and 6111, and various others, have been used to produce automotive structural parts and body-in-white ("BIW") parts.

There is a demand for the use of aluminium alloys which are formable and having in particular increased strength after being subjected to a paint-bake cycle. In addition, the properties normally required for such parts include a high formability for the forming operation (typically by means of stamping, deep drawing, or roll forming), high mechanical strength after paint baking so as to enabling down gauging thus minimising the weight of the part, good behaviour in the various assembly methods used in motor vehicle manufacturing such as spot welding, laser welding, laser brazing, clinching or riveting, and an acceptable cost for mass production.

There is an increasing interest for the use of 7000-series aluminium alloy products in automotive applications or other applications (e.g. railway vehicles and boats) taking benefit of the relative light weight of the aluminium alloy in combination with its high strength. For example international patent application WO-2010/049445-A1 (Aleris) discloses a structural automotive component made from an aluminium alloy sheet product having a gauge in a range of 0.5 to 4 mm, and having a composition consisting of, in wt. %: Zn 5.0-7.0%, Mg 1.5-2.3%, Cu max. 0.20%, Zr 0.05-0.25%, optionally Mn and/or Cr, Ti max. 0.15%, Fe max. 0.4%, Si max. 0.3%, and balance is made by impurities and aluminium. The sheet product has been solution heat treated ("SHT") and cooled, artificially aged, after aging formed in a shaping operation to obtain a structural automotive component of predetermined shape, and subsequently assembled with one or more other metal parts to form an assembly forming a motor vehicle component, and subjected a paint-bake cycle.

A conventional process for producing 7000-series aluminium alloy products in rolled form includes the processing steps wherein a 7000-series aluminium alloy body is cast, after which it is homogenized and then hot rolled to an intermediate gauge. Next, the 7000-series aluminium alloy body is cold rolled after which it is solution heat treated and quenched, for example by means of water such as water quenching or water spray quenching. "Solution heat treating and quenching" and the like, generally referred to herein as "solutionizing", means heating an aluminium alloy body to a suitable temperature, generally above the solvus temperature, holding at that temperature long enough to allow soluble elements to enter into solid solution, and cooling rapidly enough to hold the elements in solid solution. The suitable temperature is alloy dependent and is commonly in a range of about 430° C. to 560° C. The solid solution formed at high temperature may be retained in a supersaturated state by cooling with sufficient rapidity to restrict the precipitation of the solute atoms as coarse, incoherent particles. After solutionizing, the 7000-series aluminium alloy body may be optionally stretched a small amount (e.g., about 1-5%) for flatness, thermally treated (e.g. by natural ageing or artificial ageing) and optionally subjected to final treatment practices (e.g. a forming operation, paint-bake cycle in case of an automotive application).

The solution heat treatment can be carried out as a batch process or a continuous process. In order to produce 7000-series aluminium alloy sheet material on an industrial scale in an economical attractive manner it is required that sufficiently high line speeds can be maintained while the sheet material is moving through the continuous heat-treatment furnace. However, too high line speeds may impact on the soaking time of the strip material at the required solution heat-treatment temperature and thereby affecting amongst others the mechanical properties of the aluminium strip. Whereas too low line speeds may result in deteriorate features such as HTOD (High Temperature Oxidation Deterioration).

There is consequently a need for an improved process of producing 7000-series alloy sheet products that exhibit fine equiaxed grains and are substantially free from second phase particles.

DESCRIPTION OF THE INVENTION

It is an object of the invention to provide a method for continuously heat treating 7000-series aluminium alloy sheet having a fine equiaxed grains in combination with good mechanical properties.

This and other objects and further advantages are met or exceeded by the present invention providing a method for continuously moving uncoiled heat-treatable 7000-series aluminium alloy sheet in the direction of its length through a continuous heat-treatment furnace arranged to heat the moving aluminium sheet to a set solution heat-treatment temperature ($T_{SET}$) in the temperature range of 370° C. to 560° C., the continuous heat-treatment furnace has an entry section and an exit section, the moving aluminium sheet moves substantially horizontally through the continuous heat-treatment furnace, the continuous heat-treatment furnace is heated by means of convective heating means, and wherein the moving aluminium sheet is rapidly cooled from $T_{SET}$ to below about 100° C. on leaving the exit section, and wherein before or near the entry section of the continuous heat-treatment furnace the moving aluminium sheet is pre-heated to a temperature of 5° C. to 100° C. below the $T_{SET}$ using an average heat-up rate as function of the sheet thickness of at least $Y=-31 \cdot \ln(X)+50$, wherein "Y" is the heat-up rate in ° C./sec and "X" is the sheet thickness in mm.

The method according to the invention provides a more economical processing route due to potentially higher line speeds in the continuous heat-treatment furnace. Another advantage is that the resultant sheet product is provided with a more favourable microstructure enhancing amongst others formability, bending and ductility, for certain alloys also an improved crash performance has been found. The resultant sheet product has also an improved resistance against SCC. A high heat-up rate avoids the effect that sometimes can be found with slow heating to the solution heat treatment temperature, viz. slow heating may coarsen particles, hence requiring increased soaking times to dissolve these again to achieve the desired set of properties in the sheet product.

In an embodiment the 7000-series aluminium alloy sheet products after the solution heat-treatment step and rapid cooling in accordance with the invention have a fine equi-axed recrystallized microstructure. With recrystallized microstructure is meant that that 70% or more, and preferably about 85% or more of the grains in this condition are recrystallised. In one embodiment the fine equiaxed grains have an average grain size of 35 micron or less. In a preferred embodiment the fine equiaxed grains have an average of 30 micron or less, and more preferably of 25 micron or less. The grain size is determined via a linear intercept method known to the person skilled in the art and determined at samples taken from the sheet product at the core (T/2 position) in the L-ST direction. Although a small grain size is preferred, in practical terms this means that the average grain size is more than 2 micron, and typically more than 5 micron.

In a preferred embodiment the moving aluminium sheet is very rapidly pre-heated from ambient temperature to a temperature in a range of up to 75° C. below the $T_{SET}$, and more preferably to a temperature in a range of up to 60° C. below the $T_{SET}$. In an embodiment the moving aluminium sheet is very rapidly pre-heated from ambient temperature to a temperature up to about 10° C. below the $T_{SET}$, and more preferably up to about 5° C. below the $T_{SET}$.

Although various convective heating means can be applied, e.g. resistance heating, the continuous annealing furnace is preferably heated by convection heating using a gas firing devices with multiple air circulation devices and the state-of-the-art furnaces have temperature control means to control the set solution heat treatment temperature with a control accuracy of +/−3° C. or better.

In an embodiment the aluminium alloy sheet is being pre-heated inductively by means of induction heating, and more by means of a transverse flux induction heating device. This enables a very rapid pre-heating before the moving aluminium sheet is further heated by means of convective heating in the continuous heat-treatment furnace to $T_{SOAK}$.

In an embodiment the pre-heating is with an average heat-up rate as function of the sheet thickness of at least $Y=-50 \cdot \ln(X)+80$, wherein Y is the average cooling rate in ° C./sec and X is the sheet thickness in mm. A preferred average heat-up rate as function of the sheet thickness of at least $Y=-62 \cdot \ln(X)+100$. A more preferred average heat-up rate as function of the sheet thickness of at least $Y=-93 \cdot \ln(X)+150$. A higher heat-up rate is beneficial for various properties of the resultant aluminium sheet and is favourable also for the balance in sheet properties and allowable increased line speeds.

In an embodiment the aluminium alloy sheet at final gauge has a thickness in the range of 0.3 to 4.5 mm, more preferably of 0.7 to 4.5 mm. The sheet width is typically in the range of about 700 to 2700 mm.

In an embodiment the moving aluminium sheet moves substantially horizontally through the continuous heat-treatment furnace over a length of at least about 20 meters, preferably at least 40 meters, and more preferably of at least about 55 meters. A practical maximum length is about 125 meters, but the invention is not limited to this maximum length.

In an embodiment the soaking time of the moving aluminium sheet at $T_{SET}$ is at least 1 second, and preferably at least 5 seconds. In a further embodiment the soaking time of the moving aluminium sheet at $T_{SET}$ is at least 20 seconds, and more preferably at least 25 seconds. The soaking time ($t_{SOAK}$) is defined at the time spent at the set solution heat treatment temperature or set soaking temperature ($T_{SOAK}$) ±5° C.; for example when the $T_{SOAK}$ is 510° C. it concerns the time the moving aluminium sheet is at the temperature of 510±5° C.

In a further embodiment of the method the quenched and moving aluminium sheet is stretched up to about 2%, typically in a range of about 0.1% to 0.5%, by means of tension levelling.

Following SHT and quenching the aluminium sheet product can be formed into a component having a predetermined shape as in known in the art, e.g. shaped BIW part of a motor vehicle. Prior to the shaping operation, the sheet may be coated with a lubricant, oil or dry lubricant, suitable for the forming operation, the assembly and the surface treatment of the structural part to be produced. The aluminium sheet may also be treated to apply a surface passivation layer to enhance adhesive bonding performance.

The method according to the invention can be applied for a brought range of 7000-series alloys having Zn in a range of about 2.0% to 10% as the predominate alloying element other than aluminium.

In one embodiment, the 7000 aluminium alloy includes at least 3.0% Zn. In another embodiment, the 7000 aluminium alloy includes at least 4.0% Zn. In yet another embodiment, the 7000 aluminium alloy body includes at least 5.0% Zn. In one embodiment, the 7000 aluminium alloy includes not greater than 9.0% Zn.

The 7000 aluminium alloy may include secondary elements. The secondary elements are selected from the group consisting of magnesium, copper and combinations thereof. In one embodiment, the 7000 aluminium alloy includes magnesium. In another embodiment, the 7000 aluminium alloy includes copper. In yet another embodiment, the 7000 aluminium alloy includes both magnesium and copper.

When magnesium is used, the 7000 aluminium alloy generally includes at least 0.5% Mg. In one embodiment, the 7000 aluminium alloy includes at least 1.0% Mg. The 7000 aluminium alloy generally includes not greater than 5.0% Mg. In one embodiment, the 7000 aluminium alloy includes not greater than 4.0% Mg. In another embodiment, the 7000 aluminium alloy includes not greater than 3.0% Mg. In other embodiments, magnesium may be present as an impurity, and in these embodiments is present at levels of 0.25% or less.

When copper is used, the 7000 aluminium alloy generally includes at least 0.25% Cu. In one embodiment, the 7000 aluminium alloy includes 0.5% Cu. In yet another embodiment, the 7000 aluminium alloy includes at least 1.0% Cu. The 7xxx aluminium alloy generally includes not greater than 5.0% Cu. In one embodiment, the 7000 aluminium alloy includes not greater than 4.0% Cu, or not greater than 3.5% Cu. In one embodiment, the 7000 aluminium alloy includes not greater than 3.0% Cu. For 7000-series alloys have a purposive addition of Cu, the solution heat treatment temperature should be at least 400° C. A preferred minimum temperature is 450° C., and more preferably 460° C., and most preferably 470° C. The solution heat-treatment temperature should not exceed 560° C. A preferred maximum temperature is 530° C., and preferably not more than 520° C.

In other embodiments, copper may be present as an impurity, and in these embodiments is present at levels of less than 0.25%. In one embodiment, the 7000 aluminium alloy includes not greater than 0.10% Cu. For 7000-series alloys have no purposive addition of Cu, the solution heat treatment temperature should be at least 370° C. A preferred minimum temperature is 400° C., and more preferably 430° C., and most preferably 470° C. The solution heat-treatment temperature should not exceed 560° C. A preferred maximum temperature is 545° C., and preferably not more than 530° C.

The 7000-series aluminium alloy may comprise further, in wt. %:
Fe<0.5%, preferably <0.35%, more preferably <0.3%,
Si<0.5%, preferably <0.4%, more preferably <0.3%, and
one or more elements selected from the group consisting of:
Zr at most 0.5%, preferably 0.03 to 0.40%,
Ti at most 0.3%,
Cr at most 0.4%,
Sc at most 0.5%,
Hf at most 0.3%,
Mn at most 0.4%, preferably <0.3%,
V at most 0.4%,
Ge at most 0.4%,
Ag at most 0.5%,
and said alloy optionally containing at most:
about 0.05% Ca,
about 0.05% Sr,
about 0.004% Be,
the balance being made by aluminium and impurities. Typically such impurities are present each <0.05%, total <0.15%.

The Fe content for the alloy should be less than 0.5%, and preferably less than 0.35%, and yet more preferably less than 0.25%. When the alloy product is used for aerospace application preferably the lower-end of this range is preferred, e.g. less than about 0.08%, and more preferably less than about 0.05% in order to maintain in particular the toughness at a sufficiently high level. Where the alloy product is used for automotive application, a somewhat higher Fe content can be tolerated. The Si content for the alloy should be less than 0.5%, and preferably less than 0.4%, and yet more preferably less than 0.3%. When the alloy product is used for aerospace application preferably the lower-end of this range is preferred, e.g. less than about 0.10%, and more preferably less than about 0.05% in order to maintain in particular the toughness at a sufficiently high level. Where the alloy product is used for automotive application, a somewhat higher Si content can be tolerated.

Silver in a range of at most about 0.5% can be added to further enhance the strength during ageing. A preferred lower limit for the Ag addition would be about 0.03% and more preferably about 0.08%. A preferred upper limit would be about 0.4%.

Each of the dispersoid forming elements Zr, Sc, Hf, V, Cr and Mn can be added to control the grain structure and the quench sensitivity. The optimum levels of dispersoid formers depend on the processing, but when one single chemistry of main elements (Zn, Cu, and Mg) is chosen within the preferred window and that chemistry will be used for all relevant products forms, then Zr levels are less than about 0.5%.

A preferred maximum for the Zr level is 0.40%. A suitable range of the Zr level is about 0.03 to 0.40%. A more preferred upper-limit for the Zr addition is about 0.18%. However, for certain high formability applications of the sheet product (e.g. nacelles, nose cones for jet aircraft) the Zr-content may range to 0.40%. Zr is a preferred alloying element in the alloy product when processed according to this invention. Although Zr can be added in combination with Mn, for thicker gauge products manufactured using the method of this invention it is preferred that when Zr is added that any addition of Mn is avoided, preferably by keeping Mn at a level of less than 0.04%. In thicker gauge product the Mn-phases coarsens more rapid than the Zr phases, thereby adversely affecting the quench sensitivity of the alloy product.

The addition of Sc is preferably not more than about 0.5% or more preferably not more than 0.3%, and even more preferably not more than about 0.18%. When combined with Sc, the sum of Sc+Zr should be less then 0.3%, preferably less than 0.2%, in particular where the ratio of Zr and Sc is between 0.7 and 1.4%.

Another dispersoid former that can be added, alone or with other dispersoid formers is Cr. Cr levels should preferably be below about 0.4%, and more preferably a maximum of about 0.3%, and even more preferably about 0.2%. A preferred lower limit for the Cr would be about 0.04%. Although Cr alone may not be as effective as solely Zr, at least for use in tooling plate of the alloy wrought product, similar hardness results may be obtained. When combined with Zr, the sum of Zr+Cr should not be above about 0.23%.

The preferred sum of Sc+Zr+Cr should not be above about 0.4%, and more preferably not more than 0.27%.

In another embodiment of the aluminium alloy wrought product according to the invention the alloy product is free of Cr, in practical terms this would mean that the Cr content is at regular impurity levels of <0.05%, and preferably <0.02%, and more preferably the alloy is essentially free or substantially free from Cr. With "substantially free" and "essentially free" we mean that no purposive addition of this alloying element was made to the composition, but that due to impurities and/or leaching from contact with manufacturing equipment, trace quantities of this element may, nevertheless, find their way into the final alloy product.

Mn can be added as a single dispersoid former or in combination with one of the other dispersoid formers. A maximum for the Mn addition is about 0.4%. A suitable range for the Mn addition is in the range of about 0.05% to 0.4%, and preferably in the range of about 0.05% to 0.3%. A preferred lower limit for the Mn addition is about 0.12%. When combined with Zr, the sum of Mn+Zr should be less then about 0.4%, preferably less than about 0.32%.

In another embodiment of the aluminium alloy wrought product according to the invention the alloy is free of Mn, in practical terms this would mean that the Mn-content is <0.03%, and preferably <0.02%, and more preferably the alloy is essentially free or substantially free from Mn. With "substantially free" and "essentially free" we mean that no purposive addition of this alloying element was made to the composition, but that due to impurities and/or leaching from contact with manufacturing equipment, trace quantities of this element may, nevertheless, find their way into the final alloy product.

In another preferred embodiment of the aluminium alloy wrought product according to this invention the alloy has no deliberate addition of V such that it is only present, if present, at regular impurity levels of less than 0.05%, preferably less than 0.02%.

Another element to reduce quench sensitivity of the alloy sheet product would be to add up to 0.4% of Ge. A preferred addition would be in the range of 0.03% to 0.4%.

Ti can be added to the alloy product amongst others for grain refiner purposes during casting of the alloy stock, e.g. ingots or billets. The addition of Ti should not exceed 0.3%. A preferred lower limit for the Ti addition is about 0.01%. Ti can be added as a sole element or with either boron or carbon serving as a casting aid, for grain size control.

As known in the art 7000-series alloy products may optionally further comprise at most about 0.05% Ca, at most about 0.05% Sr, and/or at most about 0.004% Be. Traditionally, beryllium additions have served as a deoxidizer/ingot cracking deterrent and may be used in the alloy product according to this invention. Though for environmental, health and safety reasons, more preferred embodiments of this invention are substantially Be-free. Minor amounts of Ca and Sr alone or in combination can be added to the alloy product for the same purposes as Be. Preferred addition of Ca is in a range of about 10 to 100 ppm.

In one embodiment, the 7000-series aluminium alloy has a Cu-content of less than 0.25% and is one of the following 7000-series aluminium alloys, as defined by the Aluminium Association: 7003, 7004, 7204, 7005, 7108, 7108A, 7015, 7017, 7018, 7019, 7019A, 7020, 7021, 7024, 7025, 7028, 7030, 7031, 7033, 7035, 7035A, 7039, 7046, and 7046A. For 7000-series alloys have no purposive addition of Cu, the solution heat treatment temperature should be at least 370° C. A preferred minimum temperature is 400° C., more preferably 430° C., and more preferably 450° C., and most preferably 470° C. The solution heat-treatment temperature should not exceed 560° C. A preferred maximum temperature is 545° C., and preferably not more than 530° C.

In one embodiment, the 7000-series aluminium alloy has a Cu-content of 0.25% or more and is one of the following 7000-series aluminium alloys, as defined by the Aluminium Association: 7009, 7010, 7012, 7014, 7016, 7116, 7022, 7122, 7023, 7026, 7029, 7129, 7229, 7032, 7033, 7034, 7036, 7136, 7037, 7040, 7140, 7041, 7049, 7049A, 7149, 7249, 7349, 7449, 7050, 7050A, 7150, 7250, 7055, 7155, 7255, 7056, 7060, 7064, 7065, 7068, 7168, 7075, 7175, 7475, 7076, 7178, 7278, 7278A, 7081, 7181, 7085, 7185, 7090, 7093, 7095 and 7099. For 7000-series alloys have a purposive addition of Cu, the solution heat treatment temperature should be at least 400° C. A preferred minimum temperature is 450° C., and more preferably 460° C., and most preferably 470° C. The solution heat-treatment temperature should not exceed 560° C. A preferred maximum temperature is 530° C., and preferably not more than 520° C.

Examples where the sheet product manufactured according to the invention can be used in an automotive applications, include closure panels (e.g. hoods, fenders, doors, roofs, and trunk lids, among others), wheels, tunnels, bulkheads, footwells, and critical strength applications, such as body-in-white (e.g., A-, B-, and C-pillars, reinforcements) applications, and automotive crashworthy or other energy-absorbing applications amongst others. In some of these applications the products may allow down-gauging of the components and weight savings.

In the building of rail vehicles the aluminium sheet can be used amongst others to built cab interiors, door systems, enter end skins, and inter end canopies.

The sheet product can be used also to manufacture shaped three dimensional architectural panels.

The sheet product can be used to manufacture for example nose cones for jet aircraft, nacelles for wind turbines, engine nacelle skins, lip skins, wing tips, winglets, and acoustic panels.

DESCRIPTION OF THE DRAWINGS

The invention shall now be described with reference to the appended drawings, in which:

FIG. 3 is a schematic representation of the required minimum heat-up rate as function of sheet thickness and with preferred embodiments.

FIG. 1 provides a schematic representation of the method in accordance with the invention and the continuous heat-treatment furnace used. The continuous heat-treatment furnace (1) is arranged to transport and to heat-treat uncoiled aluminium sheet (2) moving in the direction of its length. The aluminium sheet is being uncoiled from coil (8). It moves through the continuous heat-treatment furnace (3) having an entry portion (4) and an exit portion (5). On leaving the exit portion (5) the moving aluminium sheet is rapidly cooled in the cooling section (6) to below about 100° C., e.g. to about room temperature. An industrial continuous heat-treatment furnace represents a substantial capital investment; once commissioned and operational significant modifications such as making it longer in length are often not feasible due to lay-out constraints on the shop floor.

The moving or travelling aluminium sheet moves substantially horizontally through the continuous heat-treatment furnace over a length of at least about 20 meters, preferably over at least 55 meters. Hot-air nozzles (not shown) throughout the furnace length heat the strip and keep it afloat on an air cushion. Thus the strip is travelling in a floating state; such a furnace is sometimes also referred to as convection floating furnace. The elimination of mechanical contact at elevated temperature in the heat-treatment furnace translates into a fault-free strip surface. The continuous heat-treatment furnace can be modular in design; as such the furnace comprises several heating zones that use turbines (not shown) to generate an air channel consisting of top and bottom airflows. The air is heated by burners that work preferably with combustion pre-heated air. Temperature control of the set soak temperature is with a control accuracy of +/−3° C. or better.

Figure 1:
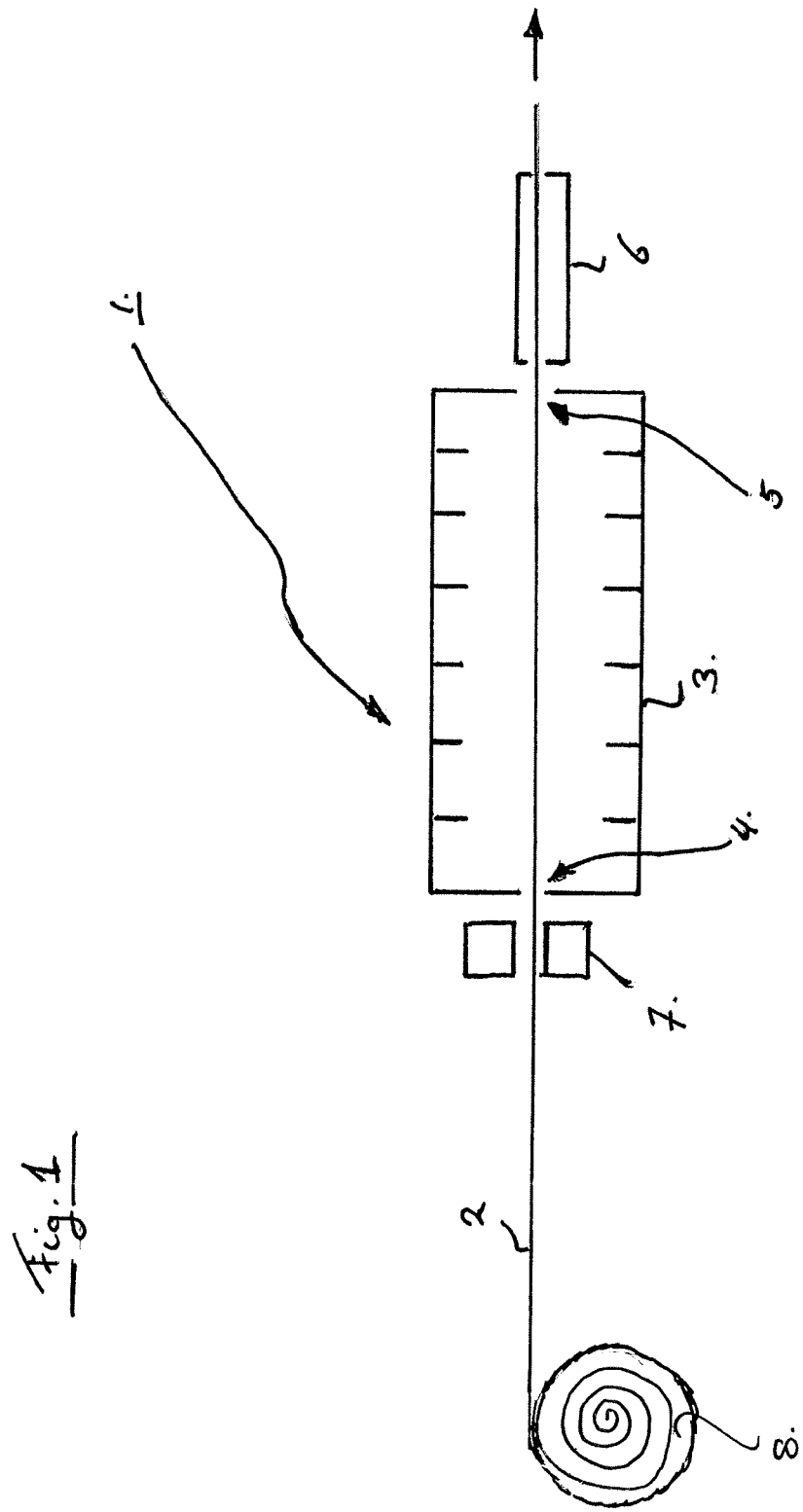
FIG. 1 is a schematic representation of the method and the apparatus used.
Figure 2A:
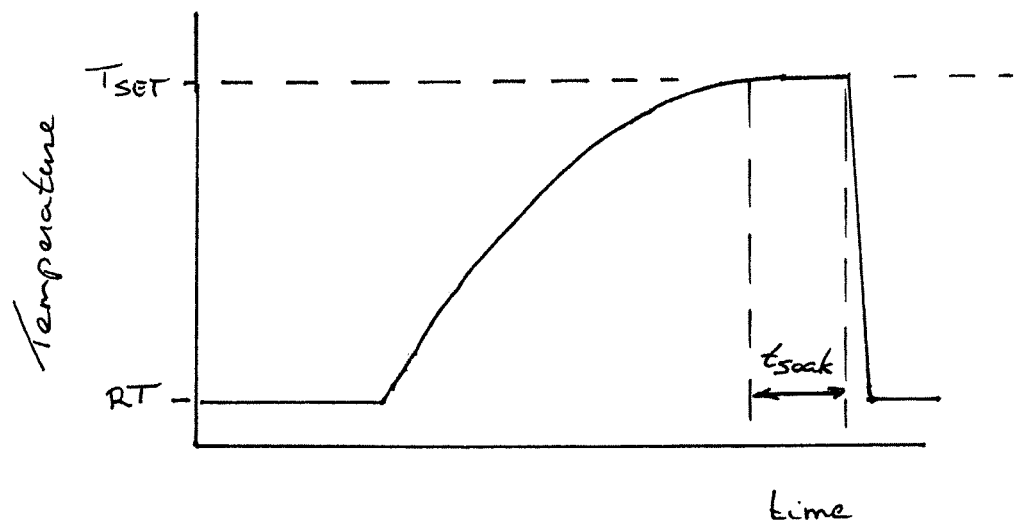
FIG. 2A and FIG. 2B are a schematic representation of a temperature profile as function of the time of aluminium sheet travelling through a continuous heat-treatment furnace according to the state-of-the-art and according to the invention.

The moving sheet (2) enters the entry section (4) at high strip speed or line speed at ambient temperature and is gradually heated-up while travelling through the continuous heat-treatment furnace to a preset solution heat treatment temperature (e.g. about 510° C.) depending on the aluminium alloy. In a conventional continuous heat-treatment furnace the average heat-up rate of the aluminium sheet is typically in a range of about 10-15° C./sec for an about 1 mm sheet material. Depending on the strip speed the strip temperature may reach the actual preset solution heat treatment temperature only far into the second-half of the furnace length or even near the end of the continuous heat-treatment furnace and it is actually soaked at the solution heat treatment temperature for a very short period of time, e.g. a few seconds, whereafter the moving sheet is leaving the heat-treatment furnace at the exit section (5) and is immediately quenched in the cooling section (6). This is also schematically shown in FIG. 2A where the moving aluminium sheet is gradually being heated up from room temperature (RT) to the solution heat treatment temperature ($T_{SET}$) and is soaked for a number of seconds ($t_{SOAK}$) at the set solution heat treatment temperature or set soak temperature. The soaking time ($t_{SOAK}$) is defined at the time spent at the set solution heat treatment temperature or set soaking temperature ($T_{SOAK}$)±5° C.

Depending on the aluminium alloy composition or sheet thickness a longer soaking time at the preset solution heat treatment temperature can be very desirable in order to achieve the desired balance of mechanical properties, but for many 7000-series alloys this can only be achieved at lower strip speed due to the defined dimensions of the heat treatment furnace, which makes it economically significantly less attractive where the strip speed or line speed has to be reduced from for example about 40 m/min to about 20 or 25 m/min.

Figure 2B:
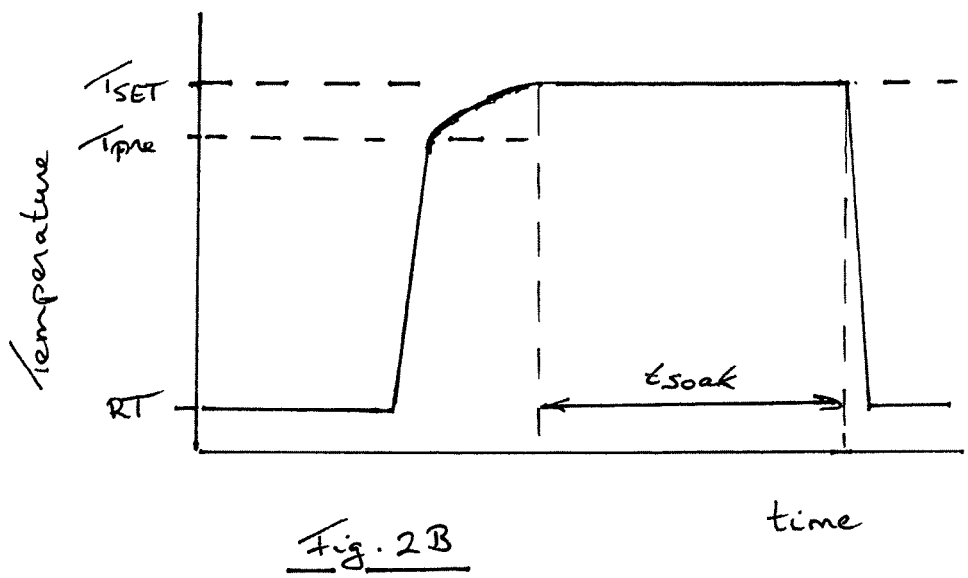

In accordance with the invention this balance of properties and process economy has been improved by implementing a pre-heating device immediately before the entry section (4) or at the entry section (4) of the heat-treatment furnace. The pre-heat device (7) is arranged to enable a very fast heat-up rate defined by the equation of the heat-up rate as function of the sheet thickness of at least $Y=-31 \cdot \ln(X)+50$, wherein Y is the cooling rate in ° C./sec and X is the sheet thickness in mm, and with preferred higher heat-up rates, and which can be achieved for example by means of a transverse flux induction heating device, for example as disclosed in U.S. Pat. No. 5,739,506 (Ajax Magnethermic). It is desirable that the pre-heating of the aluminium sheet in the pre-heating device (7) observes a safety margin to avoid an overshoot in the temperature of the moving strip and thereby adversely affecting relevant engineering properties due to local melting of microstructural components in the aluminium alloy. Preferably the pre-heat is to a temperature of about 5° C. to 100° C., more preferably of about 5° C. to 75° C., below the preset solution heat treatment temperature at which the heat treatment of the aluminium alloy sheet material should be carried out. Thus for example preheating of the moving aluminium sheet to about 480° C. where the preset solution heat treatment temperature is 510° C. Further heating-up of the moving sheet occurs in the continuous heat-treatment furnace by convective heating. This is also schematically shown in FIG. 2B where the moving aluminium sheet is rapidly pre-heated from room temperature (RT) to the pre-heat temperature ($T_{PRE}$) and then further heated to the set solution heat treatment temperature ($T_{SET}$). The heat-up rate from RT to $T_{PRE}$ will in practice not be exactly linear and for that reason the average heat-up rate is used being the temperature difference between $T_{PRE}$ minus RT divided by the time required to reach $T_{PRE}$; thus for example for 1 mm sheet material when from a room temperature of 25° C. a $T_{PRE}$ of about 480° C. is reached in about 5 sec, the average heat-up rate is about 91° C./sec. This allows, compared to the situation where there is no rapid pre-heating applied, a significantly longer soaking time at the set solution heat treatment temperature while maintaining about the same strip speed. Alternatively, it allows for a significantly increased line speed while having an about the same soaking time ($t_{SOAK}$) compared to the state-of-the art situation. Thus for a given continuous annealing furnace, depending on the specific 7000-series alloy there is now significantly more flexibility in optimising soaking time in combination with the line speed in order to arrive at an improved balance of process economy and sheet properties.

By the method according to the invention and the use of the corresponding apparatus also thicker gauge sheet material can be processed at relative high strip speeds. Where for example a 1 mm sheet material can be processed with line speeds of up to about 70 m/min, a 2 mm sheet material of the same alloy can be processed only with a line speed of up to about 35 m/min due to the significantly longer heat-up time when heated in a convection furnace. With the method and apparatus according to the invention wherein the sheet material is preheated very rapidly to about 480° C. and the solution heat treatment temperature is about 510° C. the 2 mm sheet material can now be continuously heat treated at significantly higher line speeds in the range about 55 to 65 m/min while having an about similar $t_{SOAK}$ as the 1 mm sheet material.

FIG. 3 is a schematic representation of the required minimum average heat-up rate as function of the sheet thickness (line 1) and with preferred embodiments (lines 2-4) for the method according to this invention and also for the apparatus and kit-of-parts. The relationship is shown for sheet gauges in the preferred gauge range of 0.3 to 4.5 mm. For lines 1 to 4 the following natural logarithmic equations apply:

$Y=-31 \cdot \ln(X)+50$ Line 1:

$Y=-50 \cdot \ln(X)+80$ Line 2:

$Y=-62 \cdot \ln(X)+100$ Line 3:

$Y=-93 \cdot \ln(X)+150$ Line 4:

and wherein "Y" represents the average heat-up rate in ° C./sec and "X" represents the sheet thickness in mm.

The invention claimed is:

1. A method for continuously annealing aluminium alloy sheet, comprising:
   continuously moving uncoiled heat-treatable 7000-series aluminium alloy sheet having Zn in a range of 2.0% to 10.0% in the direction of its length through a continuous heat-treatment furnace arranged to heat the moving aluminium sheet to a set solution heat-treatment temperature ($T_{SET}$) in the temperature range of 370° C. to 560° C., the continuous heat-treatment furnace has an entry section and an exit section, wherein the moving aluminium sheet moves substantially horizontally through the continuous heat-treatment furnace, wherein the continuous heat-treatment furnace is heated by convective heating, and
   wherein the moving aluminium sheet is rapidly cooled from $T_{SET}$ to below about 100° C. on leaving the exit section, and
   wherein before or near the entry section of the continuous heat-treatment furnace the moving aluminium sheet is pre-heated to a temperature of 5° C. to 100° C. below the $T_{SET}$ using an average heat-up rate as function of the sheet thickness of at least $Y=-31 \cdot \ln(X)+50$, wherein "Y" is the heat-up rate in ° C./sec and "X" is the sheet thickness in mm, wherein the aluminium alloy sheet at final gauge has a thickness in the range of 0.3 to 4.5 mm.

2. The method according to claim 1, wherein before or at the entry section of the continuous annealing furnace the moving aluminium sheet is pre-heated to a temperature of 5° C. to 100° C. below the $T_{SET}$ using an average heat-up rate as function of the sheet thickness of at least $Y=-50\cdot\ln(X)+80$, wherein Y is the heat-up rate in °C./sec and X is the sheet thickness in mm.

3. The method according to claim 1, wherein the pre-heating is performed inductively by means of induction heating.

4. The method according to claim 1, wherein the moving aluminium sheet moves substantially horizontally through the continuous heat-treatment furnace over a length of at least 20 meters.

5. The method according to claim 1, wherein the soaking time of the moving aluminium sheet at $T_{SET}$ is at least 1 seconds.

6. The method according to claim 1, wherein the moving aluminium sheet is pre-heated to a temperature of 5° C. to 75° C. below the $T_{SET}$.

7. The method according to claim 1, wherein the aluminium sheet has been pre-treated by homogenisation, hot rolling, and optionally by cold rolling.

8. The method according to claim 1, wherein the 7000-series aluminium sheet has Mg in the range of 1.0% to 3.0%.

9. The method according to claim 1, wherein the 7000-series aluminium sheet has Cu is the range of <0.25%.

10. The method according to claim 1, wherein the 7000-series aluminium sheet has Cu in the range of 0.25% to 3.5%.

11. The method according to claim 1, wherein the 7000-series aluminium sheet further comprises:
Fe<0.5%,
Si<0.5%, and
one or more elements selected from the group consisting of:
Zr at most 0.5,
Ti at most 0.3,
Cr at most 0.4,
Sc at most 0.5,
Hf at most 0.3,
Mn at most 0.4,
V at most 0.4,
Ge at most 0.4,
Ag at most 0.5,
balance being aluminium and impurities.

12. The method according to claim 11, wherein the 7000-series aluminium sheet comprises:
Fe in the range of <0.35%,
Si in the range of <0.4%.

13. The method according to claim 1, wherein the 7000-series aluminium sheet has following solution heat treatment and cooling an equiaxed recrystallized microstructure.

14. The method according to claim 1, wherein before or at the entry section of the continuous annealing furnace the moving aluminium sheet is pre-heated to a temperature of 5° C. to 100° C. below the $T_{SET}$ using an average heat-up rate as function of the sheet thickness of at least $Y=-62\cdot\ln(X)+100$, wherein Y is the heat-up rate in °C./sec and X is the sheet thickness in mm.

15. The method according to claim 1, wherein the pre-heating is done inductively by means of a transverse flux induction heating device.

16. The method according to claim 1, wherein the moving aluminium sheet moves substantially horizontally through the continuous heat-treatment furnace over a length of at least 40 meters.

17. The method according to claim 1, wherein the soaking time of the moving aluminium sheet at $T_{SET}$ is at least 5 seconds.

18. The method according to claim 1, wherein the 7000-series aluminium sheet has Zn in the range of 3.0% to 9.0%.

* * * * *